(12) United States Patent
Desserouer

(10) Patent No.: US 8,482,855 B2
(45) Date of Patent: Jul. 9, 2013

(54) DIELECTRIC COATED METAL DIFFRACTION GRATING WITH HIGH REFLECTION RESISTANCE TO A FEMTOSECOND MODE FLOW

(75) Inventor: Frederic Desserouer, Les Molieres (FR)

(73) Assignee: Horiba Jobin Yvon SAS, Longjumeau (FR)

( * ) Notice: Subject to any disclaimer, the term of this patent is extended or adjusted under 35 U.S.C. 154(b) by 0 days.

(21) Appl. No.: 13/318,170

(22) PCT Filed: Apr. 28, 2010

(86) PCT No.: PCT/FR2010/050808
§ 371 (c)(1),
(2), (4) Date: Oct. 31, 2011

(87) PCT Pub. No.: WO2010/125308
PCT Pub. Date: Nov. 4, 2010

(65) Prior Publication Data
US 2012/0093191 A1    Apr. 19, 2012

(30) Foreign Application Priority Data
Apr. 29, 2009   (FR) ...................................... 09 52832

(51) Int. Cl.
G02B 5/18      (2006.01)
G02B 3/08      (2006.01)
H01S 3/08      (2006.01)

(52) U.S. Cl.
CPC ............ *G02B 5/1861* (2013.01); *G02B 5/1809* (2013.01); *H01S 3/08009* (2013.01)

USPC ........... 359/576; 359/574; 359/333; 427/162; 428/631; 428/612

(58) Field of Classification Search
CPC .............................. G02B 5/1861; G02B 5/1809
USPC ..................................................... 359/574, 576
See application file for complete search history.

(56) References Cited

U.S. PATENT DOCUMENTS 4,227,769 A * 10/1980 Phillips et al. .................. 385/37
4,419,533 A * 12/1983 Czubatyj et al. ............... 136/259

(Continued)

OTHER PUBLICATIONS

International Search Report dated Oct. 6, 2010, corresponding to PCT/FR2010/050808.

(Continued)

*Primary Examiner* — Mark Hellner
*Assistant Examiner* — Ari M Diacou
(74) *Attorney, Agent, or Firm* — Young & Thompson

(57) ABSTRACT

A reflection metal diffraction grating has a high diffraction efficiency for diffracting femtosecond mode laser pulses, and includes a substrate with a set of lines having a pitch Λ. The substrate is made of metal or covered with a metal layer, and the grating includes a thin film of dielectric material having a thickness, the dielectric film covering the metal surface of the lines of the grating, the grating being suitable for receiving a pulsed electromagnetic lightwave in a femtosecond mode. The thickness of the dielectric thin film is lower than 50 nm, and is suitable for reducing by a third order factor at least the maximum of the square of the electric field of the electromagnetic lightwave on the metal surface and in the metal layer of the substrate as compared to the square of the electric field at the surface of a metal grating not having a dielectric thin film.

10 Claims, 4 Drawing Sheets

U.S. PATENT DOCUMENTS

| | | | | |
|---|---|---|---|---|
| 4,736,360 A | * | 4/1988 | McMahon | 398/87 |
| 5,024,726 A | * | 6/1991 | Fujiwara | 216/24 |
| 5,155,622 A | * | 10/1992 | Kawatsuki et al. | 359/485.03 |
| 5,323,266 A | * | 6/1994 | Flint et al. | 359/566 |
| 5,535,055 A | * | 7/1996 | Ono et al. | 359/489.06 |
| 5,659,531 A | * | 8/1997 | Ono et al. | 359/489.06 |
| 5,999,318 A | * | 12/1999 | Morton et al. | 359/572 |
| 6,162,495 A | * | 12/2000 | Morton | 427/166 |
| 6,191,890 B1 | * | 2/2001 | Baets et al. | 359/572 |
| 6,839,173 B2 | * | 1/2005 | Shimmo et al. | 359/572 |
| 7,158,302 B2 | * | 1/2007 | Chiu et al. | 359/485.03 |
| 7,710,652 B2 | * | 5/2010 | Dichtl | 359/580 |
| 8,238,027 B2 | * | 8/2012 | Tompkin et al. | 359/569 |
| 2002/0001672 A1 | * | 1/2002 | Pan et al. | 427/162 |
| 2002/0044359 A1 | * | 4/2002 | Shimmo et al. | 359/572 |
| 2003/0067687 A1 | * | 4/2003 | Barton et al. | 359/569 |
| 2003/0234982 A1 | * | 12/2003 | Shimmo et al. | 359/566 |
| 2004/0125449 A1 | * | 7/2004 | Sales | 359/486 |
| 2004/0190141 A1 | * | 9/2004 | Wolfe et al. | 359/572 |
| 2005/0030627 A1 | * | 2/2005 | Kleemann et al. | 359/571 |
| 2005/0088739 A1 | * | 4/2005 | Chiu et al. | 359/486 |
| 2005/0088744 A1 | * | 4/2005 | Smith et al. | 359/566 |
| 2005/0207013 A1 | * | 9/2005 | Kanno et al. | 359/576 |
| 2009/0027776 A1 | * | 1/2009 | Schall et al. | 359/571 |
| 2009/0225424 A1 | * | 9/2009 | Zimmer et al. | 359/572 |
| 2010/0053611 A1 | * | 3/2010 | Padmore et al. | 356/328 |
| 2012/0212821 A1 | * | 8/2012 | Iwata | 359/569 |

OTHER PUBLICATIONS

Neauport et al.; "Effect of Electric Field on Laser Induced Damage Threshold of Multilayer Dielectric Gratings"; Optics Express Optical Society of America USA, No. 19; Sep. 17, 2007.

Ragnar Bodefeld; "Alternative Laseroptische Bauelemente fur Ultrakurze Pulse"; Nov. 5, 2002.

* cited by examiner

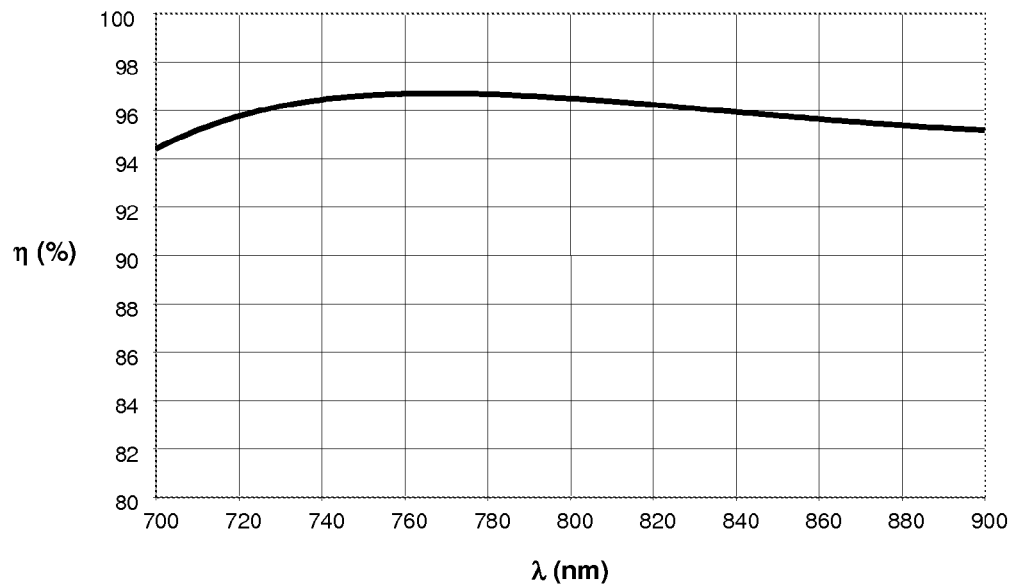
Prior Art                Figure 3
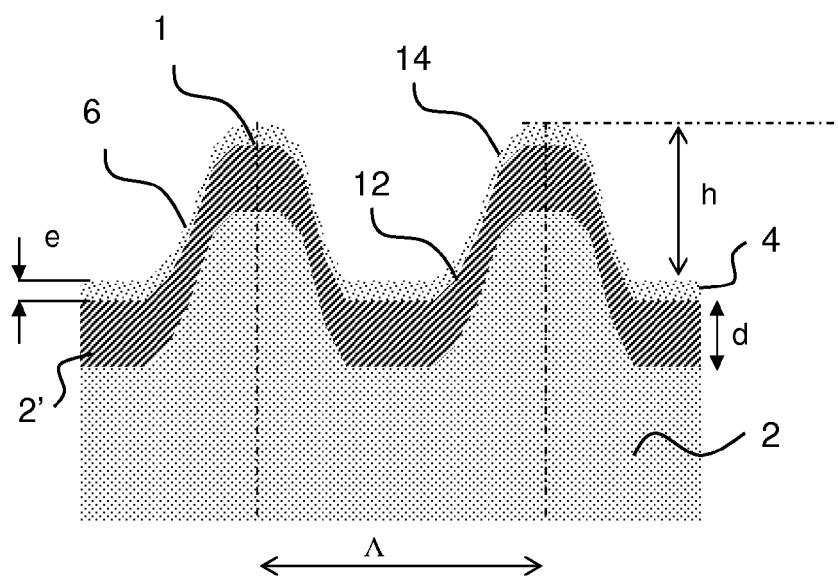
Figure 4

DIELECTRIC COATED METAL DIFFRACTION GRATING WITH HIGH REFLECTION RESISTANCE TO A FEMTOSECOND MODE FLOW

BACKGROUND OF THE INVENTION

1. Field of the Invention

The present invention relates to a reflection diffraction grating for use in a pulse laser chain and having an improved laser flow resistance compared with a conventional metallic grating in the femtosecond regime.

2. Description of the Related Art

Today, in the fields of plasma physics or nuclear fusion, ultra-short pulse lasers (pulse duration shorter than 500 fs) with higher and higher energies are used in order to reach peak powers approaching the PetaWatt (PW), or even more.

However, the maximum reachable power is limited by the flow resistance of the optical components. The laser flow resistance of an optical component depends in particular on the surface energy density and on the pulse duration.

The problems of damage threshold of the optical components in high-energy pulse lasers have been partially solved by the technique of chirped pulse amplification (CPA). The CPA principle is to submit the light pulse to a time-spreading process, which reduces the peak power, to amplify it and, at the end of the laser chain, to time recompress it to obtain the desired short pulse. Thus, the light power during the amplification may be reduced by several orders of magnitude. However, it remains a risk to destroy an optical component in the stage that performs the pulse compression, based in particular on the use of diffraction gratings. Some of those components are indeed exposed to the energy-amplified and time-compressed pulse, having thus the highest peak power. The diffraction gratings of the compressors are thus limiting components in terms of flow resistance.

The diffraction gratings for pulse compression were first conventional metallic gratings. For pulse compression in the infrared domain (at 800 nm, 1053 nm or 1550 nm), there is no use of aluminium gratings because their diffraction efficiency, generally lower than 90%, is not sufficient. Instead, gratings covered with a layer of gold are used. The gold-based gratings offer an excellent diffraction efficiency over a wide spectral bandwidth and require no protective layer because the gold is an inoxidizable material. However, the gold-based gratings suffer from a limited laser flow resistance in the femtosecond regime. Therefore, for the femtosecond domain, with pulses shorter than 500 fs, the damage threshold is of the order of 0.2-0.3 J/cm$^2$ for the conventional gold-based gratings.

A first solution to permit increasing the laser power is to increase the size of the beams and of the optical components so as to reduce the surface illumination. But increasing the size of optics, in particular for the diffraction gratings, rapidly comes up against technical limitations of production as well as against a significant increase of the fabrication cost. There is thus a great interest in increasing the flow resistance of the diffraction gratings.

Another solution to further increase the diffraction efficiency and the flow resistance has been to fabricate diffraction gratings on dielectric mirrors (MLD: multi-layer dielectric). An MLD grating generally comprises an alternating stack of a great number of layers made of two fully-transparent dielectric materials having different optical indices and alternating in the thickness direction, and a grating formed in the last thin layer, at the surface of the multi-layer stack. Such MLD gratings are described in detail in many articles, for example: "Design of high-efficiency dielectric reflection grating" by Shore et al., JOSA A, Vol. 14, Issue 5, pp. 1124-1136, "High-Efficiency Dielectric Reflection Gratings: Design, Fabrication, and Analysis" by Hehl et al., Applied Optics, Vol. 38, Issue 30, pp. 6257-6271, "Design of diffraction gratings for multipetawatt laser compressors" by Bonod et al., Proc. SPIE, Vol. 5962, 59622M (2005).

These publications recommend to fabricate diffraction gratings from fully dielectric, transparent and without absorption materials, comprising a high number of bilayers, so as to obtain MLD gratings with a flow resistance two to three times better than that of the gratings having only one layer of gold. In theory, the MLD gratings have also a diffraction efficiency higher than that of the gold-based gratings. The MLD gratings thus progressively replace the gold-based metallic gratings in the very high intensity pulse compressors.

However, the MLD gratings are more complicated to fabricate than the metallic gratings and are thus more expensive. Moreover, the MLD gratings have a too limited spectral bandwidth (a few tens of nm) to be used in ultra-short pulse (<50 fs) laser chains. Indeed, the duration of the laser pulse is Fourier transform-linked to the spectral bandwidth of the laser, which means that the product of the pulse duration with the spectral width of the light radiation is a constant. By way of information, at the central wavelength of 800 nm, which is commonly used today, this product is equal to about 1000 fs.nm, which means that to obtain a pulse with a time width shorter than 10 fs, a bandwidth wider than 100 nm is required, i.e. a very high efficiency bandwidth (>90%) over a wavelength domain surrounding the central wavelength of interest. A MLD diffraction grating cannot have such bandwidth performance. The MLD gratings have a bandwidth typically lower than 50 nm at the central wavelength of 1053 nm.

The flow resistance of the optical elements (materials, mirrors, diffraction gratings) exposed to laser pulses is still a vast domain of investigation, wherein all the phenomena are not yet explained. The damages caused to the materials due to the laser flow in the nanosecond to picosecond pulse regimes are rather well known today. In the femtosecond domain, new phenomena occur and the damage mode is different.

In the picosecond and nanosecond regimes, the main phenomena are of thermal nature and are linked to the absorption, in particular as regard the metallic gratings. Whatever the material is, the damage threshold follows a square root law of the pulse duration. The following articles describe a number of measures and models of laser damage on mirrors and diffraction gratings: "Optical ablation by high-power short-pulse lasers" by Stuart et al., JOSA B, Vol. 13, Issue 2, pp. 459-468, "Short-pulse laser damage in transparent materials as a function of pulse duration" by Tien et al., Physical Review Letters, Volume 82, Issue 19, May 10, 1999, pp.3883-3886.

For femtosecond pulse durations, this law is not followed, the physical phenomena at the local scale of a grating line then appear to be linked to the square of the electric field of the electromagnetic lightwave in the materials. It is thus demonstrated by the following articles: "Multilayer dielectric gratings for petawatt-class laser systems" by Britten et al. Proceedings of the SPIE, Volume 5273, pp. 1-7 (2004), "Effect of electric field on laser induced damage threshold of multilayer dielectric gratings" by Neauport et al., Optics Express, Vol. 15, Issue 19, pp. 12508-12522, that the damages in diffraction gratings in the femtosecond regime (pulse duration shorter than 500 fs) is strongly linked to the square value of the electric field in the material forming the profile of the diffraction grating lines.

Indeed, for very efficient diffraction gratings (i.e. whose diffracted energy is almost fully concentrated in the useful diffraction order (the order −1 for this type of grating)), stationary waves are formed due to the interference of the incident field with the diffracted field, and the electric field may have an amplitude of twice that of the incident field near or inside the material, which is referred to as "reinforcement of the electric field".

A conventional metallic diffraction grating operates in TM polarization with a metallic treatment, usually gold. The electric field at the metal and the metal-vacuum interface presents areas of high field-reinforcement at some points of the line profile that constitute the weakening areas regarding the flow resistance.

The laser flow resistance depends of course also on the quality of fabrication: purity of the materials used, density of the materials, absence of impurities or defects (cracks, inclusions, bubbles, roughness).

The type of material used has logically also a great influence on the flow resistance, as well explained in the following article about different transparent materials: "Scaling laws of femtosecond laser pulse induced breakdown in oxide films" by Mero et al., Phys. Rev. B 71, 115109 (2005).

BRIEF SUMMARY OF THE INVENTION

The invention aims to produce a reflection diffraction grating having at the same time a high diffraction efficiency, an extended spectral bandwidth (several tens of nanometres) and an improved damage threshold, permitting the exposition of the grating to a high power laser flow in the femtosecond regime.

For that purpose, the invention relates to a reflection metallic diffraction grating having a very high diffraction efficiency for diffracting laser pulses in the femtosecond regime, said grating comprising a substrate with a set of lines having a pitch $\Lambda$, said substrate being metallic or covered with a metallic layer, and said grating comprising a thin layer of a dielectric material having a thickness e, said thin dielectric layer covering the metallic surface of the lines of the grating, said grating being suitable for receiving a pulsed electromagnetic lightwave in the femtosecond regime. According to the invention, the thickness e of the thin dielectric layer is lower than 50 nm, the thickness e being suitable for reducing by at least a factor three the maxima of the square of the electric field of the electromagnetic lightwave on the metallic surface and in the metallic layer of the substrate, compared with the square of the electric field at the surface of a metallic grating having no thin dielectric layer, in order to improve the laser flow resistance of the diffraction grating in the femtosecond regime.

According to particular aspects of the invention:
the diffraction grating is a TM polarized grating;
the lines of the grating have, in a plane transverse to the direction of the lines, a sinusoidal, pseudo-sinusoidal, triangular, rectangular, trapezoidal or pseudo-trapezoidal profile;
the thin dielectric layer has a thickness e that is smaller than the depth of modulation h of the lines of the grating;
the thin dielectric layer is made of silica ($SiO_2$);
the substrate is covered with a gold metallic layer;
the dielectric layer is transparent over the optical bandwidth [$\lambda \pm \Delta\lambda/2$] and the thickness e of the thin dielectric layer is lower than or equal to the thickness for which the diffraction efficiency in TM polarization is attenuated by a coefficient $\alpha$ (comprised between 0 and 1), compared with the diffraction efficiency of a metallic grating having lines with the same profile and having no thin dielectric layer;
the diffraction efficiency of the grating in TM polarization is higher than 90% over the optical bandwidth [$\lambda \pm \Delta\lambda/2$].

The invention also relates to a chirped pulse amplification (CPA) system comprising one stage for time spreading the laser pulses, one or more amplification stages, and one compression stage for time compressing the amplified pulses, wherein the compression stage includes at least one metallic diffraction grating covered with a thin dielectric layer according to the invention.

The invention finally relates to a method for improving the damage threshold of a metallic diffraction grating to an intense laser beam in the femtosecond regime, comprising a step of selecting a diffraction grating of very high reflection diffraction efficiency comprising a substrate with a set of lines having a pitch $\Lambda$, said substrate being metallic or covered with a metallic layer. According to the invention, the method of improvement comprises a step of depositing a thin dielectric layer on the metallic surface of the grating lines, said thin dielectric layer being transparent over the spectral bandwidth of the femtosecond pulses and the thickness e of the dielectric layer being suitable for reducing by at least a factor three the maxima of the electric field of the electromagnetic lightwave on the metallic surface and in the metallic layer, compared with the electric field at the surface of a metallic grating having no thin dielectric layer.

The present invention also relates to the characteristics that will be revealed by the following description and that will be considered either alone or in any technically possible combination thereof.

BRIEF DESCRIPTION OF THE DRAWINGS

Such description is given by way of a non-limitative example and will permit to better understand how the invention can be implemented, with reference to the appended drawings, in which:

FIG. 3 shows the spectral curve of the diffraction efficiency in TM polarization of a metallic grating according to the prior art;

FIG. 4 schematically shows a cross-sectional view of two lines of a diffraction grating according to an embodiment of the invention;

DETAILED DESCRIPTION OF THE PREFERRED EMBODIMENTS

Figure 1:
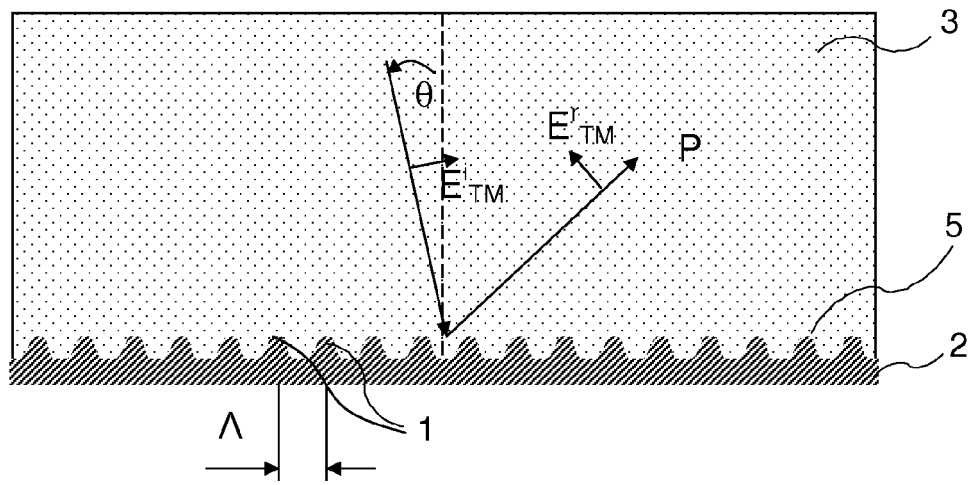
FIG. 1 schematically shows a reflection diffraction grating according to the prior art, in a cross-sectional view in a plane transverse to the lines of the grating, exposed to a TM-polarized incident beam, diffracting in an order P.

The invention relates in particular to a method for improving the laser flow resistance of reflective metallic diffraction gratings subjected to ultra-intense and ultra-short (pulse duration <500 fs) laser pulses.

The current working spectral domain in the domain of the short pulse lasers is located in the near infrared (700 nm–1100 nm). The ultra-short pulses are mainly made at a central wavelength of 800 nm, which is the middle of the gain range of the crystal Ti:Sapphire that is the most often used in the ultra-short pulse laser chains.

In the femtosecond pulse domain, it is established that one of the parameters that have an influence on the flow resistance is the square of the electric field in the material constituting the optical component. For the diffraction gratings of high diffraction efficiency, the local electric field around the profile of the grating and inside the material(s) constituting the grating may be reinforced by effect of interference, thus creating "hot spots" that, if they are inside or near the material, reduce the damage threshold of the component.

The invention describes a method for pushing away these "hot spots", those areas of electric field reinforcement, outside the material constituting the diffraction grating for a modified metallic grating and away from the metallic interface that constitutes the weak spot in terms of damage for the gratings of the prior art.

The invention consists in depositing a layer of a transparent dielectric material on a metallic grating. Said layer of dielectric material has to be thick enough to be deposited with the usual techniques of vacuum deposition on a surface that is modulated as a diffraction grating is. But the dielectric layer has to be the thinnest possible not to degrade the efficiency of the grating over the spectral bandwidth considered. Such a modified metallic diffraction grating operates in TM polarization as operates a metallic grating of the prior art. The thickness of the dielectric layer is thin enough not to degrade the efficiency and bandwidth performance of the original metallic grating. The grating thus fabricated still operates in TM polarization.

The addition of a thin dielectric layer has for effect to push away the areas of field reinforcement outside the grating profile, i.e. at the boundary of the dielectric material. The amplitude of the electric field (and the square thereof) is then much lower in the dielectric material and at the metal-dielectric interface, which increases the flow resistance compared with a simple metallic grating.

In order to further optimize the flow resistance, the chosen dielectric material is preferably a material having the greatest intrinsic flow resistance, such as the silica ($SiO_2$). Other dielectric materials may also be used ($TiO_2$, $Ta_2O_5$, $HfO_2$ and $Al_2O_3$) according to the applications.

The electric field amplitude of the electromagnetic lightwave at the metal-dielectric interface strongly decreases with respect to the field amplitude at the metal-vacuum (or air) interface, compared with a metallic grating of the prior art. The field in the dielectric material is also rather low and the maximum of field reinforcement is located outside the material. Thus, the electric field at the metallic interface is significantly reduced with respect to the metallic grating of the prior art.

As the flow resistance in this domain is reversely proportional to the field square, such a modified metallic grating has thus a much better flow resistance than a metallic grating of the prior art. Complementarily, the dielectric material may also be chosen so that the intrinsic flow resistance thereof is the highest possible.

To illustrate the invention, reference is made to an example of pulse compression grating conventionally used for normal values of use.

More precisely, reference is made to a diffraction grating 5, with a line density of N=1480 mm$^{-1}$ (i.e. a pitch Λ =675 nm), used under a constant incidence angle Θ of 42° with respect to the normal to the grating, this angle corresponding to a deviation between the incident beam and the reflected beam of 11° at the central wavelength of 800 nm in the reflection order −1 (cf. FIG. 1).

In practice, the line profiles of the diffraction gratings made by the manufacturers may be of the lamellar, sinusoidal or pseudo-sinusoidal, trapezoidal or rounded trapezoidal type, or in the form of a rounded bump, according to the embodiment used (holographic, machined holographic, ion machining, e-beam) and the parameters describing the profile are multiple. The invention applies to all the types of grating profiles.

To simplify the explanation of the invention, the profile studied is a sinusoidal profile of line 1, which reduces the description of the profile to only one parameter, the height of modulation h of the grating.

Figure 2:
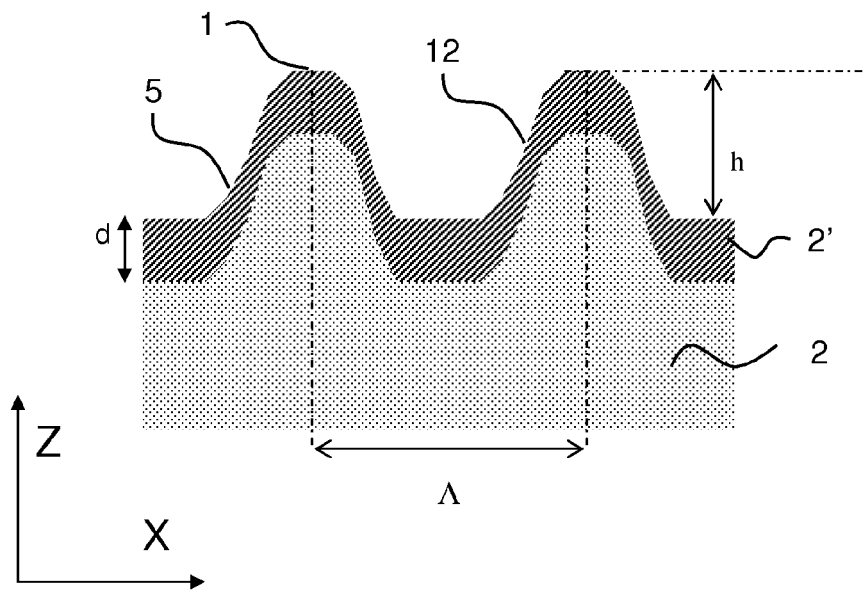
FIG. 2 schematically shows a cross-sectional view of two lines of a metallic diffraction grating according to the prior art.

Reference is made to the prior art grating shown in cross-section in FIGS. 1 and 2 (enlarged transverse cross-sectional view of two lines of the grating). The grating 5 comprises a substrate 2 giving the profile shape of the diffraction grating lines. The substrate 2 may be a substrate made of bulk metallic material or covered with a layer 2' of metallic material. The metal (2, 2') has an index $n_m$=0.5+i*10, with a significant complex part, and a thickness d sufficient to ensure a good reflectivity in TM polarization. The shape of the lines in FIGS. 1-2 is of the bump type, by way of illustration, the depth of modulation h gives the height of the grating lines. The grating pitch is Λ. The lines 1 are reproduced in the direction X transverse to the grating lines. The incident beam on the metallic surface 12 of the grating lines is diffracted.

To simplify the explanation, reference is made to a sinusoidal grating so as to reduce the number of variables describing the profile of the grating lines to only one parameter, i.e. the depth of modulation h.

FIG. 3 shows a curve of diffraction efficiency 11 simulated for a sinusoidal metallic grating of the prior art having a modulation η=240 nm at the incidence of 42° in TM polarization, as a function of the wavelength λ over a domain comprised between 700 nm and 900 nm.

The diffraction efficiency of the metallic grating 5 in the order −1 is thus very high (>94%) over a wide range of wavelengths.

FIG. 4 schematically shows the structure of the lines of a diffraction grating 6 according to an embodiment of the invention (enlarged transverse cross-section of two lines of the grating 6). The grating 6 comprises a thin layer 4 of dielectric material deposited on the surface 12 of a metallic grating 5 such as described with reference to FIGS. 1-2.

By way of example, the refraction index of the thin dielectric layer 4 is herein equal to 1.5. The other parameter is the thickness e of the dielectric treatment deposited. The surface 14 exposed to the incident laser beam is thus the surface of the thin dielectric layer 4. The thickness e of the dielectric layer 4 is optimized so as to avoid a too important degradation of the diffraction efficiency performance of the grating 6. The layer 4 must not be too thick.

Figure 5:
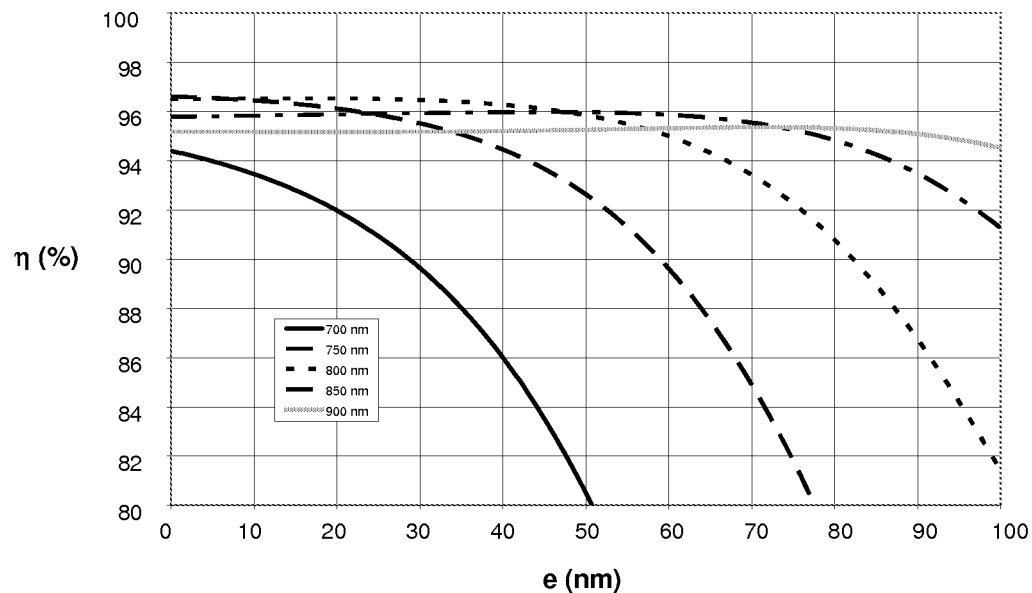
FIG. 5 shows the curves of the diffraction efficiency in TM polarization of diffraction gratings according to the invention, as a function of the thickness of the dielectric layer and for different wavelengths.

FIG. 5 shows curves of simulation of the diffraction efficiency of a diffraction grating 6 as a function of the thickness e of the dielectric treatment 4 deposited on the surface of a metallic grating (the same as for the curve of FIG. 3), for five wavelengths uniformly distributed over the studied spectrum ($\lambda$=700, 750, 800, 850 and 900 nm, respectively) in TM polarization.

The dielectric material layer 4 has for effect to degrade the diffraction efficiency $\eta$ of the grating 6 when the thickness e thereof increases, and this for all the wavelengths, but with different amplitudes. It is at the low wavelengths (700 and 750 nm) that the efficiency $\eta$ decreases the more rapidly as a function of the thickness e of the dielectric treatment. By taking as a criterion that it is desired not to degrade the efficiency over all the spectral range of a coefficient $(1-\alpha)$ equal at most to 15%, it is obtained that the thickness e of the dielectric layer has to be lower than 50 nm.

Thus, in order not to degrade the diffraction efficiency of the grating 6, the thickness e of the dielectric deposit must not exceed a few tens of nm, which is perfectly obtainable with the usual means of vacuum deposition. Moreover, these thickness values are low with respect to the depth of modulation h (240 nm) of the grating, which limits the deformations of the profile after the deposition.

For continuing the explanation of the invention, reference is made to a dielectric treatment thickness e equal to about 25 nm.

Figure 6:
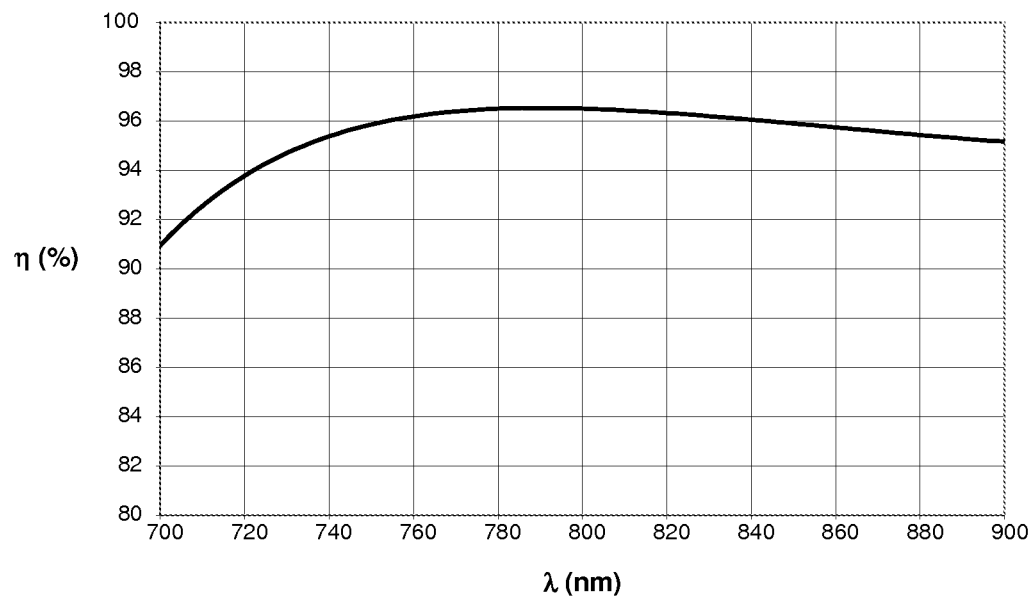
FIG. 6 shows the spectral curve of the diffraction efficiency in TM polarization of a grating according to an embodiment of the invention.

FIG. 6 shows a curve of diffraction efficiency $\eta$ in TM polarization of a diffraction grating 6 with a sinusoidal metallic profile, of modulation 240 nm, covered with a 25 nm-thick dielectric layer 4, at the incidence of 42°, as a function of the wavelength over a domain comprised between 700 nm and 900 nm.

The diffraction grating 6 comprising a dielectric layer 4 at the surface of the substrate made of metal 2 or covered with metal 2' keeps a very high diffraction efficiency $\eta$ (>91%) over the spectral range of interest.

The matter is now to demonstrate the beneficial effect on the laser flow resistance for ultra-intense pulses whose duration is in the domain of the femtosecond pulses. In this domain of operation, it is now demonstrated that one of the significant parameters for the flow resistance is the square of the electric field near or inside the materials. The electric field of the electromagnetic lightwave is thus the parameter to be studied.

A simulation of the electric field existing in and around the grating profile is shown for the case of the sinusoidal metallic grating 5 of the prior art and for the case of the metallic grating 6 covered with a thin dielectric layer 4, with the same conditions of use, i.e. an incidence angle $\theta$ of 42° and a central wavelength $\lambda$ of 800 nm in TM polarization.

Figure 7:
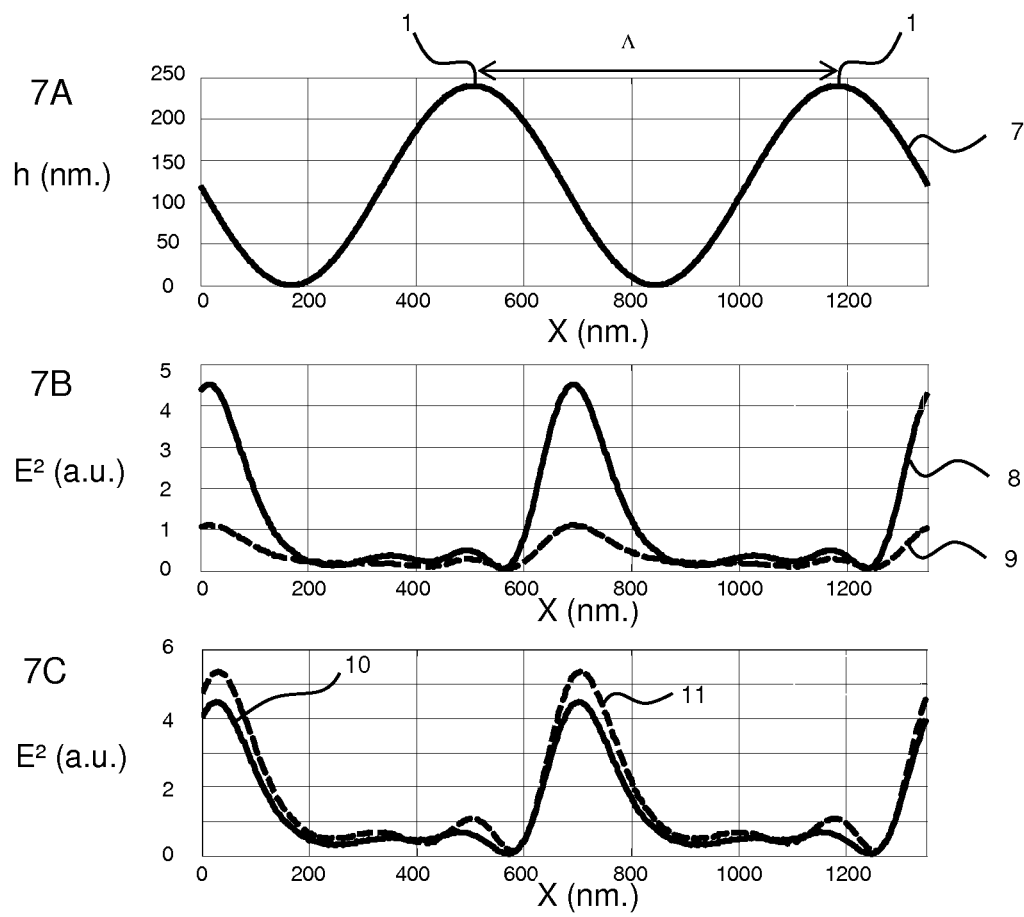
FIG. 7A shows the profile of modulation of the lines of a grating, in a local (two lines) cross-sectional view in a plane transverse to the grating lines.
FIG. 7B shows a simulation of the square of the electric field of the electromagnetic lightwave in the plane of the FIG. 7A, at a distance of 5 nm in front of the metallic surface of a grating exposed to a laser flow, in the case of a conventional metallic grating (full line) and in the case of a grating according to an embodiment of the invention (dashed line), respectively, those two gratings having a line profile in accordance with that shown in FIG. 7A.
FIG. 7C shows a simulation of the square of the electric field of the electromagnetic lightwave in the plane of the FIG. 7A, at a distance of 30 nm in front of the metallic surface of a grating exposed to a laser flow, in the case of a conventional metallic grating (full line) and in the case of a grating according to an embodiment of the invention (dashed line), respectively, those two gratings having a line profile shown in FIG. 7A.

FIG. 7A shows the profile of the lines in a plane transverse to the grating lines (only two lines of the grating are shown), such profile being used in the simulations of FIGS. 7B and 7C. The abscissa represents the direction X of the periodicity of the grating lines (in nm), and the ordinate represents the depth of the lines in nm. The bottom of the sinusoidal profile is at the ordinate 0, indicated by the thin horizontal line, and the depth of modulation of the profile is h=240 nm. In the simulations, a conventional metallic grating, wherein the surface 12 of the grating 5 has the profile of FIG. 7A, and a metallic grating covered with a thin dielectric layer, wherein the surface 14 of the grating 6 has also the profile of FIG. 7A, are respectively used.

FIG. 7B shows the amplitude of the square electric field for the case of a metallic grating 5 of the prior art at a distance of 5 nm in front of the metal-air (or metal-vacuum) interface in the case of a metallic grating of the prior art (curve 8 in full line), and at a distance of 5 nm from the metal-dielectric interface for a metallic grating covered with a dielectric material layer of 25 nm (curve 9 in dashed line), and thus inside the dielectric layer 4, respectively.

In the curve 8 of a metallic grating 5, it can be seen that there is an area in the right slope of the profile in which the reinforcement of the electric field is strong (over-current that can reach a factor four) on the right flank of the grating lines at the air-metal (or vacuum-metal) interface: this area of a metallic grating is the area exposed to the highest electric field density and will thus be damaged in first in the femtosecond domain.

The curve 9 shows that, for a grating according to the invention, the electric field intensity at 5 nm from the metal-dielectric interface is strongly attenuated with respect to the curve 8. No reinforcement of the electric field is observed near the metal.

FIG. 7C shows the amplitude of the square electric field for the case of a metallic grating of the prior art at a distance of 30 nm in front of the metal-air (or metal-vacuum) interface, in the case of a metallic grating of the prior art (curve 10 in full line), and at a distance of 30 nm from the metal-dielectric interface, for a metallic grating covered with a dielectric material layer of 25 nm (curve 11 in dashed line), and thus in the vacuum at 5 nm from the surface 14 of the dielectric layer, respectively.

The same peaks of over-current in the vacuum are observed at a distance of 5 nm from the dielectric/vacuum interface than at 30 nm from the metal/vacuum interface. However, the very good resistance of a dielectric layer, in particular silica, allows the grating of the invention to support these over-currents, whereas a conventional metallic grating of the prior art does not withstand such over-currents in the femtosecond regime.

The grating of the invention thus permits to approach the damage threshold limits of the MLD-type gratings.

As a conclusion, the effect of the dielectric layer 4 permits to push the areas of reinforcement of the electromagnetic wave electric field away from the metallic surface and from the metallic layer of the substrate. As the dielectric materials such as the silica have intrinsically a very higher flow resistance than that of the metals, the flow resistance of the component is very significantly improved. In the prior art, the weak spot of the component was the air-metal (or vacuum-metal) interface. The invention permits to push the areas in which the electric field is reinforced away from the critical metallic interface, on a much more flow resistant dielectric-air (or vacuum) interface.

The metallic diffraction grating 6 covered with a thin dielectric layer 4 has a very good diffraction efficiency (>90%) over a very wide bandwidth (200 nm), with a flow resistance that may be close to that of the MLD gratings.

The object of the invention permits to improve a high efficiency diffraction grating in the femtosecond regime by pushing the furthest away possible the areas of field reinforcement of the materials constituting the grating and by using a material resisting where the electric field is the stronger.

The invention applies to gratings on plane, concave or convex substrates.

The invention thus permits to push away the electric field maxima outside the material while keeping a good efficiency over a wide bandwidth, for a modified metallic grating. The invention finds a first application in the laser pulse compression. The invention also finds applications in the laser flow resistance of components in high-power lasers (MegaJoule, PetaWatt).

The method of fabrication of the grating according to the invention is less complicated than that of a MLD grating. The grating according to the invention is less expensive than a MLD grating.

The invention claimed is:

1. A reflection metallic diffraction grating (6) having a very high diffraction efficiency for diffracting laser pulses in the femtosecond regime, said grating comprising:
   a substrate (2) with a set of lines (1) having a pitch Λ, said substrate (2) being covered with a metallic layer (2'), and
   said grating (6) comprising a thin layer (4) of a dielectric material having a thickness e, said thin dielectric layer (4) covering the metallic surface (12) of the lines of the grating,
   wherein said grating (6) is suitable for receiving a pulsed electromagnetic lightwave in the femtosecond regime,
   wherein the thickness e of the thin dielectric layer (4) is lower than 50 nm, the thickness e being suitable for reducing by at least a factor three the maxima of the square of the electric field of the electromagnetic lightwave on the metallic surface (12) and in the metallic layer of the substrate (2, 2') compared with the square of the electric field at the surface of a metallic grating (5) having no thin dielectric layer, in order to improve the laser flow resistance of the diffraction grating in the femtosecond regime;
   wherein the metallic layer (2') is a gold metallic layer (2').

2. A diffraction grating (6) according to claim 1, wherein the diffraction grating (6) is a TM polarized grating.

3. A diffraction grating (6) according to claim 1, wherein the lines (1) of the grating have, in a plane transverse to the direction of the lines (1), a sinusoidal, pseudo-sinusoidal, triangular, rectangular, trapezoidal or pseudo-trapezoidal profile.

4. A diffraction grating (6) according to claim 1, wherein the thin dielectric layer (4) has a thickness e that is smaller than the depth of modulation h of the lines (1) of the grating.

5. A diffraction grating (6) according to claim 1, wherein the thin dielectric layer (4) is made of silica ($SiO_2$).

6. A diffraction grating (6) according to claim 1, wherein the dielectric layer (4) is transparent over the optical bandwidth [λ±Δλ/2] and the thickness e of the thin dielectric layer (4) is lower than or equal to the thickness for which the diffraction efficiency in TM polarization is attenuated by a coefficient α (comprised between 0 and 1), compared with the diffraction efficiency of a metallic grating (5) having lines (1) with the same profile and having no thin dielectric layer (4).

7. A diffraction grating according to claim 6, wherein the diffraction efficiency in TM polarization is higher than 90% over the optical bandwidth [λ±Δλ/2].

8. A chirped pulse amplification (CPA) system comprising one stage for time spreading the laser pulses, one or more amplification stages, and one compression stage for time compressing the amplified pulses, wherein the compression stage includes at least one diffraction grating (6) according to claim 1.

9. A method for improving the damage threshold of a metallic diffraction grating to an intense laser beam in the femtosecond regime, comprising:
   selecting a diffraction grating of very high reflection diffraction efficiency comprising a substrate (2) with a set of lines (1) having a pitch Λ, said substrate (2) being covered with a gold metallic layer (2'), and
   depositing a thin dielectric layer (4) on the metallic surface (12) of the grating lines, said thin dielectric layer (4) being transparent over the spectral bandwidth of the femtosecond pulses and the thickness e of the dielectric layer (4) being suitable for reducing by at least a factor three the maxima of the electric field of the electromagnetic lightwave on the metallic surface (12) and in the metallic layer (2, 2'), compared with the electric field at the surface of a metallic grating (5) having no thin dielectric layer.

10. A diffraction grating (6) according to claim 2, wherein the lines (1) of the grating have, in a plane transverse to the direction of the lines (1), a sinusoidal, pseudo-sinusoidal, triangular, rectangular, trapezoidal or pseudo-trapezoidal profile.

* * * * *